July 11, 1967 W. R. McCORMICK ET AL 3,330,627
CORROSION RESISTANT CHLORINATOR LINING
Filed Sept. 9, 1963
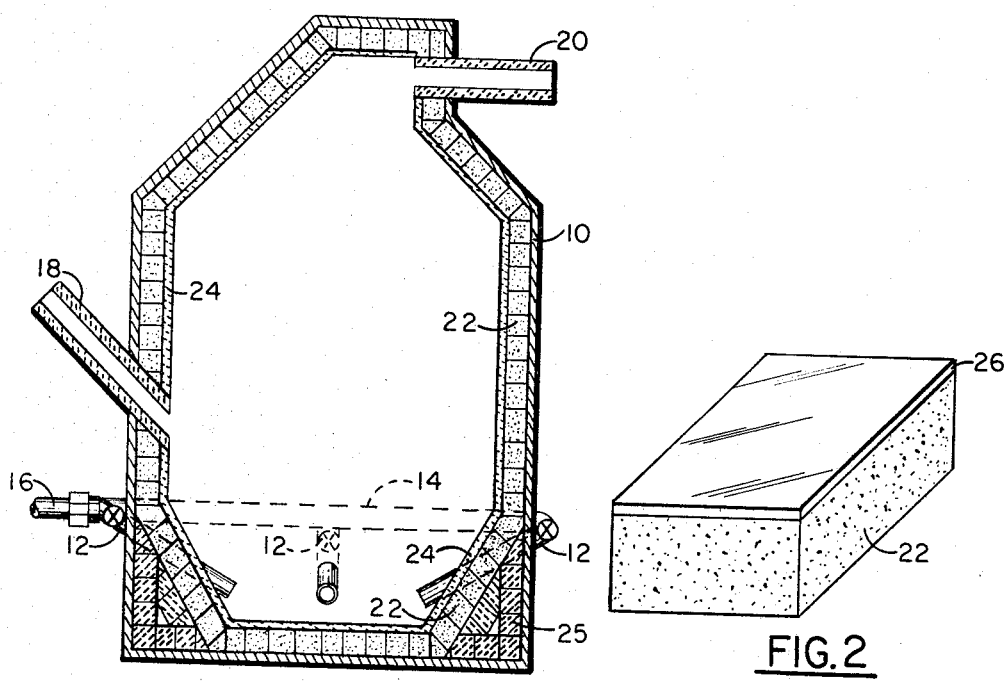
FIG. 1
FIG. 2
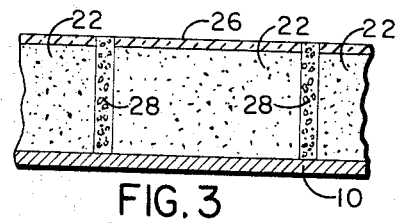
FIG. 3
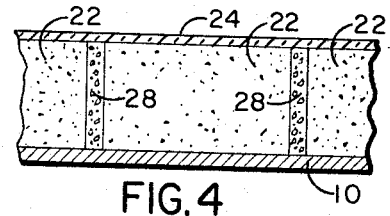
FIG. 4
INVENTORS.
Walter R. McCormick
Elbert C. Smith
BY
Agent

United States Patent Office 3,330,627
Patented July 11, 1967

3,330,627
CORROSION RESISTANT CHLORINATOR LINING
Walter R. McCormick, Las Vegas, and Elbert C. Smith, Henderson, Nev., assignors to Titanium Metals Corporation of America, New York, N.Y., a corporation of Delaware
Filed Sept. 9, 1963, Ser. No. 307,670
5 Claims. (Cl. 23—252)

This invention relates to a chlorination vessel particularly useful in a process for producing metallic chlorides by treatment of ores with gaseous chlorine at an elevated temperature.

Chlorination vessels as heretofore constructed have most often taken the form of a steel shell structure, somewhat resembling a vertical shaft furnace, lined with refractory and insulating brick. Subdivided ore or concentrate and often a carbonaceous reducing agent are fed into the vessel from the top or through a side part and chlorine is fed in through the bottom. The chlorine entry and ore feeds may be arranged to produce a so-called fluidized bed in which the ore and carbon particles are suspended and agitated in the upwardly moving chlorine gas flow during the chlorination reaction. Chlorination is carried on at elevated temperature, often of the order of 1000° C., this in many cases is supported by exothermic heat produced by the reaction. Metallic chloride is produced as a vapor together with gaseous by-products and these gases are withdrawn from the top of the furnace and the metallic chloride product is separated, condensed and purified for appropriate use. A typical example is the chlorination of rutile, $TiO_2$, in the presence of coke to produce titanium tetrachloride, $TiCl_4$, useful for production of titanium metal and titanium pigments.

The brick lining of such a chlorination vessel is subject to corrosive attack by hot chlorinator gases, and also erosion caused by the action of the contained agitated ore charge. In addition to being corrosion and erosion resistant, the furnace lining must provide sufficient thermal insulation so that exothermic or added heat can be conserved to sustain uniform elevated temperature conditions for extended periods of steady state operation. As presently constructed, chlorination vessels are lined with numerous layers of insulating brick and one or more inner layers of chlorine resistant refractory brick. The resistance to corrosion and erosion of the best available refractory brick has not proved satisfactory. Multiple layers of insulating brick have added substantial thickness to the walls resulting in a reduced diameter working interior for a given shell size or, conversely, an undesirably bulky external configuration for a desired internal capacity.

The chlorination vessel of this invention is provided with a lining several times more resistant to chlorine and chlorinator gas corrosion and erosion than the best refractory brick heretofore used for the purpose, and provides adequate thermal insulation with only a small fraction of the thickness of a conventional multiple layer insulation and refractory brick lining.

Summarized briefly, the chlorination vessel of this invention comprises a steel shell with a layer of foamed silica bricks lining this shell. The joints between the foamed silica bricks are made with a mortar consisting substantially of silica and the interior surfaces of the foamed silica bricks and the mortar joints are glazed to form a continuous, integral inner surface of vitreous silica.

This continuous inner surface of vitreous silica is, we have found, exceptionally resistant to corrosion and erosion under chlorinator operating conditions. The thermal insulating efficiency of foamed silica brick is such that only one three-inch layer of such brick is required to provide adequate thermal insulation.

The annexed drawings show a chlorinator embodying features of this invention and in which:

FIG. 1 shows a vertical cross section of a chlorination vessel lined with foam silica brick, FIG. 2 shows in more detail a foam silica brick having a glazed surface, FIG. 3 shows in more detail and enlarged foamed silica bricks as in FIG. 2 laid up with silica mortar, FIG. 4 shows the mortar joint surfaces glazed and fused with the previously glazed surface of the brick to form a continuous and integral inner surface of vitreous silica.

Referring now to FIG. 1 the chlorination vessel comprises a steel outer shell 10 provided with valved chlorine entry pipes 12 intruding into the interior of the vessel near its bottom, and with their outer ends connected to manifold 14 which is in turn connected by main 16 to a supply of chlorine gas not shown. The principles and more details of such chlorine supply arrangement are shown in U.S. patent application Ser. No. 848,633, now Patent No. 3,101,249. Side feed chute 18 is provided in a wall of shell 10 through which to feed ore and carbon mixture. Product gas off-take 20 is provided at or near the top of the vessel through which product and by-product gases may be withdrawn. The interior of shell 10 is lined with a single layer of foamed silica brick 22 laid, joined, and treated as described below, to provide a continuous integral surface 24 of vitreous silica. Fillet 25 may be provided to fill in the corner at the bottom of the vessel, and to insure somewhat smoother lifting and flow action to the suspended ore particles and also to provide support to pipes 12 whose inner ends are located spaced apart somewhat from the actual vessel sidewalls. The interior layer of bricks 22 of fillet 25 will be foam silica and their interior surfaces will be glazed to form a layer continuous with the top, bottom and sidewalls.

In FIG. 2 is shown a foam silica brick as used to form the lining of the chlorination vessel according to this invention. The brick 22 is cast in a mold and formed of a silica slip containing a foaming agent and dried, fired and trimmed as described in an article entitled "Fused Silica Ceramics" in Ceramic Age, May 1961, pages 52–58. Such a brick will be light and porous, having a large number of fine silica particles bonded to form an over-all cellular structure.

To prepare a brick as in FIG. 2 for use in lining a chlorinator, one face of the brick is coated with a layer of cement formed of fine silica particles then heated to a temperature above the melting point of the silica to produce, by fusion of the top layer of silica particles, a continuous integral glaze of vitreous silica as at 26. This layer must be thick enough to be completely vitreous and glass-like, yet not so thick as to melt down more than a thin surface layer of the brick itself. A glaze thickness of between about 1/32 to 1/8 of an inch on the face of a three-inch thick brick will prove advantageous. Fusion may be accomplished by placing brick in a suitable furnace equipped with heating means for example, a hot gas flame, which will preferentially heat the selected brick face. Temperature required for fusion and glaze formation will be of the order of 3000° to 3800° F. After the surface glaze has been produced, the brick is allowed to cool slowly and may, if necessary, be annealed to prevent shrinkage cracking of the glaze layer.

The separately glazed bricks 22 are then laid as in FIG. 3 with adjacent edges joined by a mortar made of substantially silica so as to provide a uniform brick-mortar composition. A suitable mortar may be prepared by thoroughly mixing 5 parts of silica grain (about −20 mesh), 5 parts of silica-slip prepared as described in the article in Ceramic Age, and 1 part of aqueous colloidal silica. The mortar joint 28 should be thin. About 1/16 to 1/8 inch in width and not over 1/8 inch is preferable. After the mortar has dried and set, the exposed inner surface of the mortar joint is also glazed. This is accomplished by heating with a concentrated heat source such as the flame from an oxygen-acetylene torch adjusted to provide a heated surface only slightly larger in diameter than the thickness of the mortar joint. The glazing is carefully accomplished using only the minimum heat and time to fuse the mortar to form a vitreous layer on its surface and also to fuse this layer into and with the vitreous surfaces of the adjacent foamed silica brick. Once the required conditions have been obtained, the torch can be slowly advanced along the mortar joints to provide the proper glazing and bonding so that the result is a completely continuous, integral vitreous layer over the interior surface of the foam brick lining, as is shown in part and enlarged in FIG. 4.

The vitreous silica surface formed on the foamed silica bricks and mortar joints when laid and fused is continuous in that it presents a continuous, unbroken area exposed to chlorination gases except of course for necessary openings to provide for introduction of ore and carbon feed and chlorine and for product and by-product gas withdrawal. This surface is integral with the bricks and joints in that the fusion process by which it is formed includes fusion of a small layer of the brick or joint so that the vitreous layer is an integral part of the bricks and joints it covers. Thus the layer forming this surface is impermeable to corrosive gases and being integral with the bricks and joints is highly resistant to cracking, chipping and spalling.

Formation of the required continuous, vitreous layer on the interior of the bricked surface is of essential importance. The foamed silica brick itself is surprisingly not resistant to attack by hot chlorinator gases which may often comprise chlorine, carbon monoxide and dioxide, and metallic chlorides. However, when the silica particles of which the brick is composed are fused to form a vitreous surface, as described, this surface is extremely resistant to the action of hot chlorinator gases and much more so than acid-proof refractory brick heretofore used for the purpose. In order to preserve such corrosion resistance, the vitreous surface must be continuous over the exposed area. Any cracks or fissures in the vitreous layer, destroying its continuity, will permit seepage of chlorinator gases into the porous brick interior and drastic attack. Ordinarily the formation of a continuous glaze on such a lining would be extremely difficult to obtain due to shrinkage forces on cooling, and problems involved in heating and cooling large areas. As described herein, these difficulties are avoided by glazing faces of individual bricks before laying; under these conditions, the areas involved are relatively small and shrinkage cracks can be avoided. When the bricks are laid as described with thin silica mortar joints, these can be surface glazed to form a continuous vitreous surface with the glazed brick surfaces because the area being heated and cooled is relatively small and the expansion and contraction involved will not be great enough to cause cracking. Small hairline cracks may form on the mortar joint glazed surfaces and occasionally on the brick faces but these will do no harm if they do not penetrate the surface layer to enable chlorinator gases to reach the inner mortar or brick material.

The foamed silica brick used for the lining of the chlorination vessel will be found to have exceptionally good thermal insulating properties. Therefore a single layer of brick three inches thick will provide insulation equivalent to several layers of refractory and ordinary insulating brick, and will be adequate at elevated temperatures encountered in many chlorination reactions, that is, up to about 1000° to 1200° C.

In operation of the chlorination vessel of the type illustrated, coke, coal or other combustible material is first fed into the vessel interior through chute 18 and ignited while air is introduced temporarily through chlorine entry pipes 12. This builds an initial fire inside the vessel to bring its interior up to operating temperature. When the vessel interior has been sufficiently heated, the feed or coal or coke is replaced, preferably gradually with a mixture of subdivided ore and coke, the air being replaced in like manner with chlorine. For example, in the manufacture of $TiCl_4$, the ore may be rutile of −100 mesh size fed in combination with 20 mesh by down coke. The mixture may be 25 to 30% by weight coke and the chlorine flow will be essentially stoichiometric to form $TiCl_4$ from the titanium content of the rutile. Once the chlorination vessel is hot and both carbon and chlorine are being fed in proper amounts, exothermic heat produced by the chlorination reaction will sustain operating temperature. Metallic chloride vapors plus by-product gases such as carbon monoxide and dioxide are withdrawn through outlet 20. With establishment of operation equilibrium by adjustment of the material input feed rates, such a chlorination operation can be operated continuously and the improvements in the chlorinator vessel that are the subject of this invention will permit such continuous operation for many months and even a year or two or longer without shut-down necessitated by corrosion failure of the chlorinator lining.

We claim:

1. In a chlorination vessel having a steel outer shell, the improvements comprising a layer of foamed silica bricks lining said shell, and mortar joints between said bricks made with a silica mortar, with the interior surfaces of said bricks and said mortar joints being glazed by fusion of surface portions thereof to form a continuous and integral surface of vitreous silica.

2. In a chlorination vessel having a steel outer shell, the improvements comprising a single layer of foamed silica bricks lining said shell, and mortar joints between said bricks made with a silica mortar, with the interior surfaces of said bricks and said mortar joints being glazed by fusion of surface portions thereof to form a continuous and integral surface of vitreous silica.

3. In a chlorination vessel having a steel outer shell, the improvements comprising a single layer of foamed silica bricks providing the only lining in said shell, and mortar joints between said bricks made with a silica mortar, with the interior surfaces of said bricks and said mortar joints being glazed by fusion of surface portions thereof to form a continuous and integral surface of vitreous silica.

4. In a chlorination vessel having a steel outer shell, the improvements comprising a layer of foamed silica bricks lining said shell, and mortar joints not over 1/8 inch wide between said bricks made with a silica mortar, with the interior surfaces of said bricks and said mortar joints being glazed by fusion of surface portions thereof to form a continuous and integral surface of vitreous silica.

5. In a chlorination vessel having a steel outer shell, the improvements comprising a layer of foamed silica bricks lining said shell, and mortar joints between said bricks made with a silica mortar, with the interior surfaces of said bricks being separately glazed and the interior surface of said mortar joints being fused to form a glaze thereon and to fuse this glaze to the brick surface glaze to form a continuous and integral surface of vitreous silica.

References Cited
UNITED STATES PATENTS

| | | | |
|---|---|---|---|
| 2,890,127 | 6/1959 | Ford | 106—40 |
| 3,085,855 | 4/1963 | Sutherland et al. | 23—87 |
| 3,101,249 | 8/1963 | Priscu | 23—87 |
| 3,189,337 | 6/1965 | North | 266—2.5 |

OTHER REFERENCES

Walton, J., "Fused Silica Ceramics," in Ceramic Age: vol. 77; May 1961, pp. 52–58.

MORRIS O. WOLK, *Primary Examiner.*

JAMES H. TAYMAN, JR., *Examiner.*

J. J. MULLEN, *Assistant Examiner.*